(No Model.)

ST. GEORGE J. BOSWELL.
WHIP HOLDER.

No. 293,303.   Patented Feb. 12, 1884.

WITNESSES:

INVENTOR:
St. G. J. Boswell
BY Munn & Co
ATTORNEYS.

UNITED STATES PATENT OFFICE.

ST. GEORGE J. BOSWELL, OF QUEBEC, QUEBEC, CANADA.

WHIP-HOLDER.

SPECIFICATION forming part of Letters Patent No. 293,303, dated February 12, 1884.

Application filed June 26, 1883. (No model.)

*To all whom it may concern:*

Be it known that I, ST. GEORGE J. BOSWELL, of Quebec, Canada, have invented a new and Improved Whip-Holder, of which the following is a full, clear, and exact description.

The object of my invention is to provide a new and improved device for holding a whip on a vehicle in such a manner that the whip-holder will be out of the way when not in use, but can be brought within easy reach of the hand when the whip is required.

The invention consists in a whip-socket fastened to one end of lazy-tongs, the opposite end of which is secured to the vehicle and connected with devices for extending the lazy-tongs, so that when the driver wishes to grasp the whip or to place it in the socket the lazy-tongs need only be extended in some suitable manner and will move the socket toward the driver's seat.

Reference is to be had to the accompanying drawings, forming part of this specification, in which similar letters of reference indicate corresponding parts in both figures.

Figure 1:
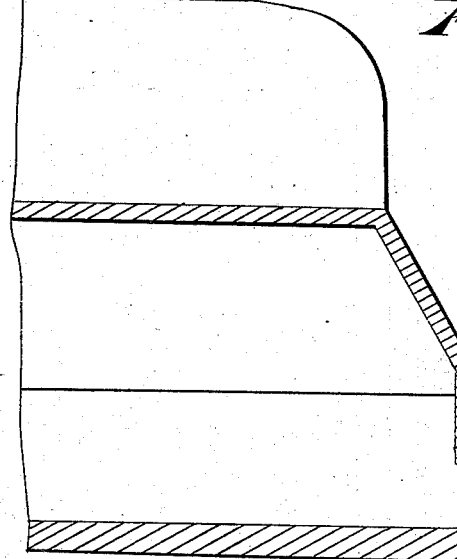
Figure 2:
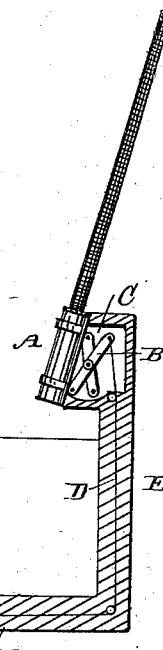
Figure 2:
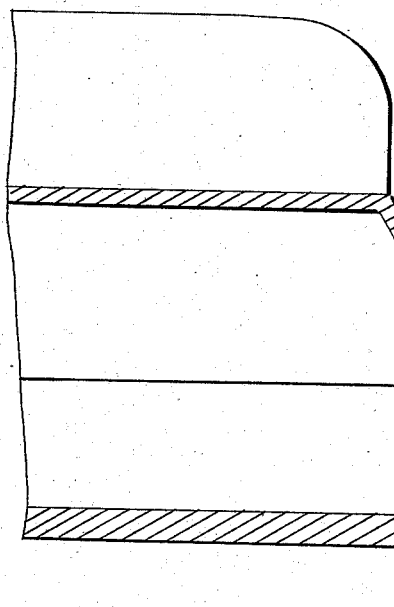

Figure 1 is a longitudinal sectional elevation of part of a vehicle provided with my improved whip-holder, showing the whip-socket held to the dash-board. Fig. 2 is a like view, showing the socket held near the driver's seat.

The whip-socket A is held to one end of lazy-tongs B, the opposite end of which is secured to the bottom of a pocket, C, on the inner side of the top of the dash-board E. Only the downwardly-projecting lever of the end of the lazy-tongs is secured to the bottom of the pocket C, and to the end of the other or upwardly-projecting lever a wire, D, chain, &c., is fastened, which passes over suitable pulleys and rollers in the dash-board E and bottom F of the vehicle, and is fastened to the lower end of a pedal, G, held in the bottom of the vehicle, and pressed upward by a spring, H. However, the wire or chain B can be attached to any suitable pedal or foot-lever, or can be arranged to be operated by hand. If the whip is to be used, the pedal G is depressed by means of the foot, and this draws the wire D downward, whereby the ends of the end levers of the lazy-tongs will be drawn toward each other—that is, the tongs are lengthened and move the socket A toward the seat, so that the whip can be easily removed from the socket or placed in the same. As soon as the pedal is released the spring H forces it upward, thereby releasing the wire D. The lazy-tongs fold together under the action of their own weight and pass into the pocket C. By securing the downwardly-projecting lever of the lower end of the lazy-tongs in the pocket C, so that it can have no movement, the whip-socket will be projected upwardly as well as outwardly.

The attachment of the outer end of the lazy-tongs to the whip-socket is to be made in such manner as to admit of the closing together and opening of the outer end levers of the lazy-tongs.

In place of the devices as shown, any other suitable devices—such, for instance, as a foot-lever or hand-lever—may be used for extending the lazy-tongs.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

1. A whip-socket fastened to one end of lazy-tongs, the other end of which is fastened to a vehicle, substantially as herein shown and described.

2. A whip-socket fastened to one end of lazy-tongs held to the bottom of a pocket in the dash-board of a vehicle, substantially as herein shown and described.

3. The combination, with a vehicle, of lazy-tongs held to the same, a whip-socket held to one end of the lazy-tongs, and devices connected with the opposite end of the tongs for the purpose of lengthening the tongs, substantially as herein shown and described.

4. The combination, with a vehicle, of lazy-tongs held to the same, a whip-socket held to one end of the tongs, the wire or chains D, connected with one lever of the end of the tongs held to the vehicle, and the pedal G with which the wire D is connected, substantially as herein shown and described.

5. The combination, with a vehicle, of lazy-tongs held to the same, a whip-socket, A, the wire or chain D, the pedal G, and the spring H, substantially as herein shown and described, and for the purpose set forth.

ST. GEORGE J. BOSWELL.

Witnesses:
HENRY C. AUSTIN,
    *Of Quebec, Notary.*
ALVIN H. JACOBS.